US012684505B2

(12) United States Patent　　(10) Patent No.:　US 12,684,505 B2

Wang et al.　　(45) Date of Patent:　　Jul. 14, 2026

(54) TIMING SYNCHRONIZATION SIGNALS AND FREQUENCY SYNCHRONIZATION SIGNALS

(71) Applicant: QUALCOMM Incorporated, San Diego, CA (US)

(72) Inventors: Xiaojie Wang, Hillsborough, NJ (US); Junyi Li, Fairless Hills, PA (US)

(73) Assignee: QUALCOMM Incorporated, San Diego, CA (US)

( * ) Notice:　Subject to any disclaimer, the term of this patent is extended or adjusted under 35 U.S.C. 154(b) by 446 days.

(21) Appl. No.: 18/298,884

(22) Filed:　Apr. 11, 2023

(65)　　　Prior Publication Data

US 2024/0349206 A1　Oct. 17, 2024

(51) Int. Cl.
*H04W 56/00*　　(2009.01)

(52) U.S. Cl.
CPC ................................. *H04W 56/001* (2013.01)

(58) Field of Classification Search
CPC ........... H04W 56/001; H04W 56/0035; H04W 56/004; H04W 56/0015
See application file for complete search history.

(56)　　　References Cited

U.S. PATENT DOCUMENTS

| 10,750,457 B2 | 8/2020 | Zeng et al. | |
| 10,813,063 B2 | 10/2020 | Ly et al. | |
| 10,887,035 B2 * | 1/2021 | Islam | .................. H04L 27/2613 |

| 11,005,698 B2 | 5/2021 | Wang et al. | |
| 2004/0005020 A1 | 1/2004 | Dent | |
| 2012/0320833 A1 * | 12/2012 | Yamamoto | .............. H04L 5/001 |
| | | | 370/328 |
| 2016/0219538 A1 | 7/2016 | Yuan et al. | |
| 2018/0092056 A1 * | 3/2018 | Zeng | ..................... H04W 56/00 |
| 2018/0109150 A1 * | 4/2018 | Khan | ...................... H02J 50/20 |
| 2018/0234931 A1 * | 8/2018 | Ly | ........................... H04W 72/30 |
| 2019/0036662 A1 * | 1/2019 | Hessler | ................. H04L 5/0048 |
| 2020/0100301 A1 * | 3/2020 | Kusashima | .......... H04W 74/06 |
| 2022/0070783 A1 * | 3/2022 | Hsieh | ................ H04W 52/0235 |
| 2023/0224889 A1 * | 7/2023 | Zhao | ................... H04W 72/121 |
| | | | 370/329 |
| 2024/0039567 A1 * | 2/2024 | Jong | ..................... H04B 7/1851 |
| 2024/0146408 A1 * | 5/2024 | Herath | ................. H04J 13/004 |

FOREIGN PATENT DOCUMENTS

WO　　　　2016108680 A1　　7/2016

OTHER PUBLICATIONS

International Search Report and Written Opinion—PCT/US2024/020439—ISA/EPO—Jul. 22, 2024.

* cited by examiner

*Primary Examiner* — Abdullahi Ahmed

(74) *Attorney, Agent, or Firm* — Patterson + Sheridan, L.L.P.

(57)　　　　ABSTRACT

Certain aspects of the present disclosure provide techniques for using timing synchronization signals (TSSs) and frequency synchronization signals (FSSs). An example method, performed at a wireless node, includes performing timing synchronization based on a first synchronization signal (SS), performing frequency synchronization based on a second SS, and communicating after performing the timing synchronization and the frequency synchronization.

28 Claims, 18 Drawing Sheets

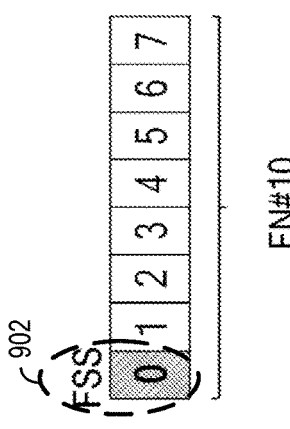
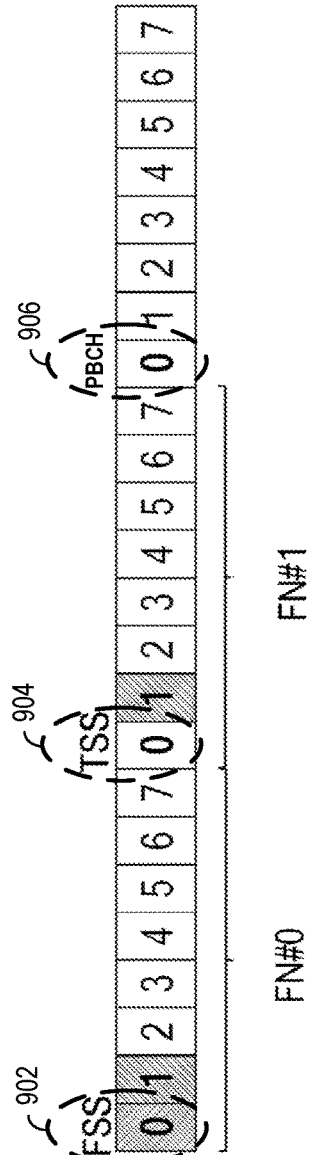
*FIG. 9*

1000

1002

1004

1006

1200
DL carrier
FSS
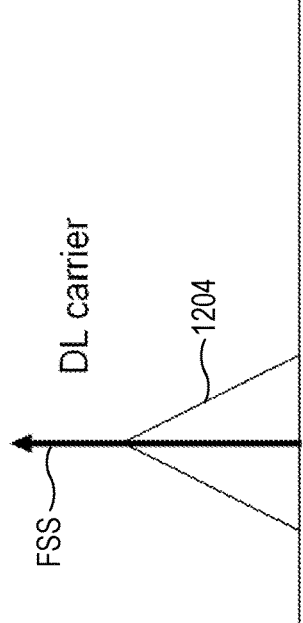
1204
UL carrier
FSS
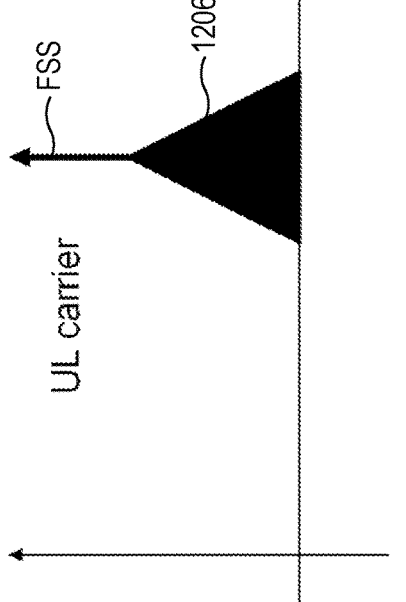
1206
*FIG. 12*

A method of wireless communications at a wireless device

Output, for transmission, a first synchronization signal (SS) for timing synchronization

1705

Output, for transmission, a second SS for frequency synchronization

1710

Communicate in accordance with the first SS and the second SS

1715

1700

TIMING SYNCHRONIZATION SIGNALS AND FREQUENCY SYNCHRONIZATION SIGNALS

BACKGROUND

Field of the Disclosure

Aspects of the present disclosure relate to wireless communications, and more particularly, to techniques for time and frequency synchronization.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications at a wireless node. The method includes performing timing synchronization based on a first synchronization signal (SS); performing frequency synchronization based on a second SS; and communicating after performing the timing synchronization and the frequency synchronization.

Another aspect provides a method of wireless communications at a wireless device. The method includes outputting, for transmission, a first synchronization signal (SS) for timing synchronization; outputting, for transmission, a second SS for frequency synchronization; and communicating in accordance with the first SS and the second SS.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 depicts example frames for primary SSs (PSSs) and secondary SSs (SSSs).

FIG. 9 depicts an example frame allocation for transmitting FSSs, TSSs, and PBCH, in accordance with certain aspects of the present disclosure.

FIG. 12 depicts another example timing diagram, in accordance with certain aspects of the present disclosure.

DETAILED DESCRIPTION

Figure 1:
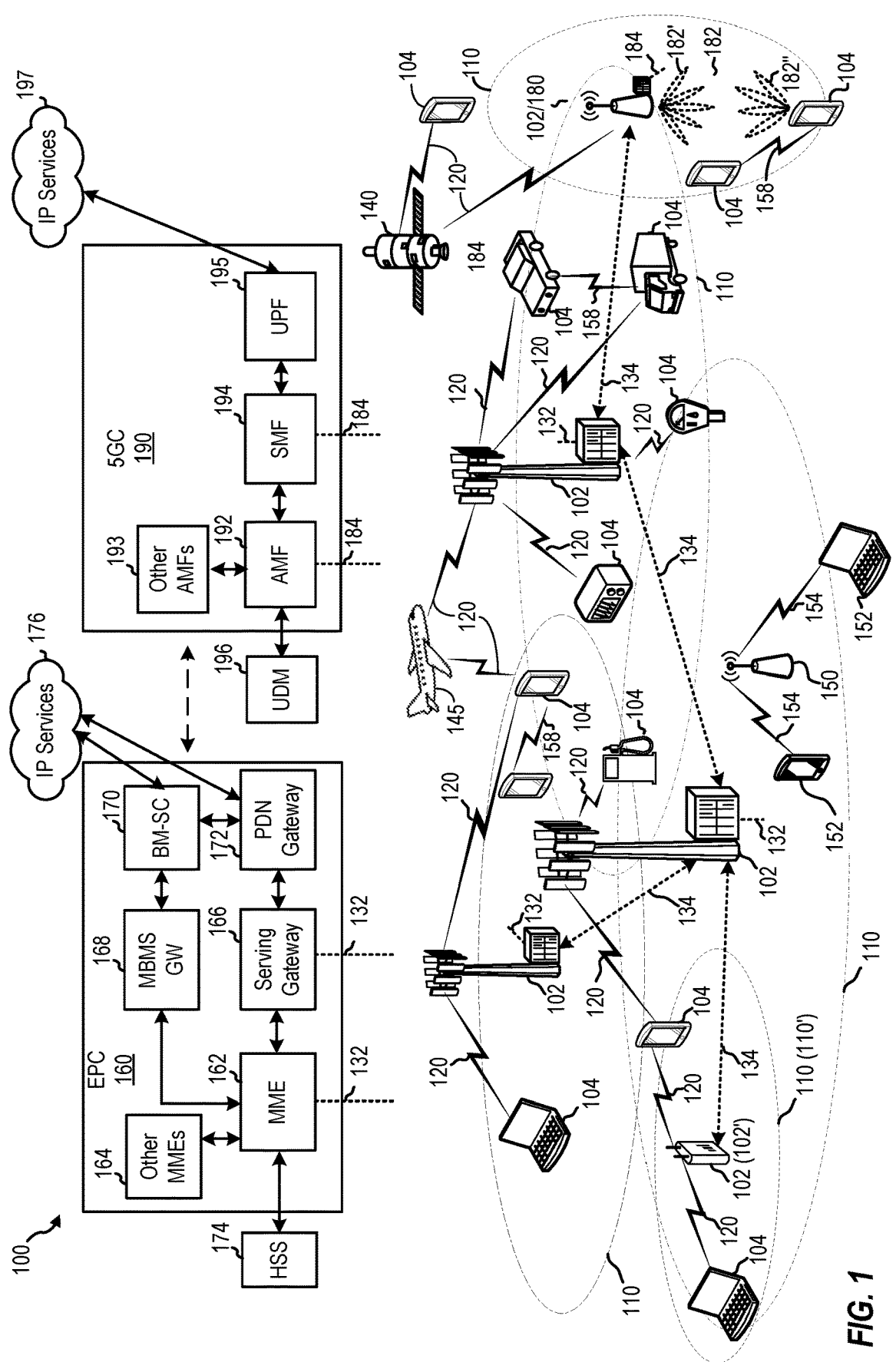
FIG. 1 depicts an example wireless communications network.

Aspects of the present disclosure provide apparatuses, methods, processing systems, and computer-readable mediums for time and frequency synchronization, for example, using timing synchronization signals (TSSs) and frequency synchronization signals (FSSs).

As used herein, the term wireless node generally refers to any type of device capable of wireless communications, such as a UE or a network entity, such as a base station (e.g., a gNB) or entity of a disaggregated base station (e.g., RU, CU or DU). The terms wireless node and wireless device may be used interchangeably.

Different types of wireless devices may have different capabilities and different bandwidth needs. For example, certain types of reduced capabilities (RedCap) wireless devices may operate on narrower bandwidths than other types of devices. One example of such a device is an Internet of Thing (IoT) device. Such devices may be used as surveillance cameras, industrial sensors, wearable, or other types of consumer devices, which may have lower peak data rates and fewer antennas in order to reduce cost and complexity. Some IoT devices, referred to as "light" or "ultra-light" IoT devices may operate on a narrowband of less than 180 KHz.

Wireless devices, such as IoT devices, may utilize synchronization signals for the purpose of (initial) time and frequency synchronization. In some cases, a combination of a primary synchronization signal (PSS) and a secondary synchronization signal (SSS) may be used to identify a physical cell identifier (PCI) of a cell. Typical synchronization signals may be designed to cover a wide variety of deployment scenarios and may be suboptimal for narrow-band IoT devices. For example, in some cases, narrowband PSS (NPSS) and narrowband SSS (NSSS) transmissions may be punctured if other reference signals, such as cell specific reference signals (CRS), are scheduled to be transmitted on overlapping resources.

Aspects of the present disclosure provide synchronization signal (SS) mechanisms that may be suitable for narrowband devices. According to certain aspects, separate SSs may be used for frequency calibration and timing acquisition. For example, a first SS, referred to as a frequency SS (FSS), may be used to tune an oscillator frequency (e.g., carrier frequency offset-CFO) calibration, while a second SS, referred to as a time SS (TSS), may be used for timing acquisition.

These TSS and FSS may be sent as narrowband transmissions, suitable for detection and measurement by IoT devices. As will be described in greater detail below, the transmissions may be optimized to enhance detection, which may result in an IoT device performing frequency synchronization and timing acquisition sooner, which may lead to improved overall performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
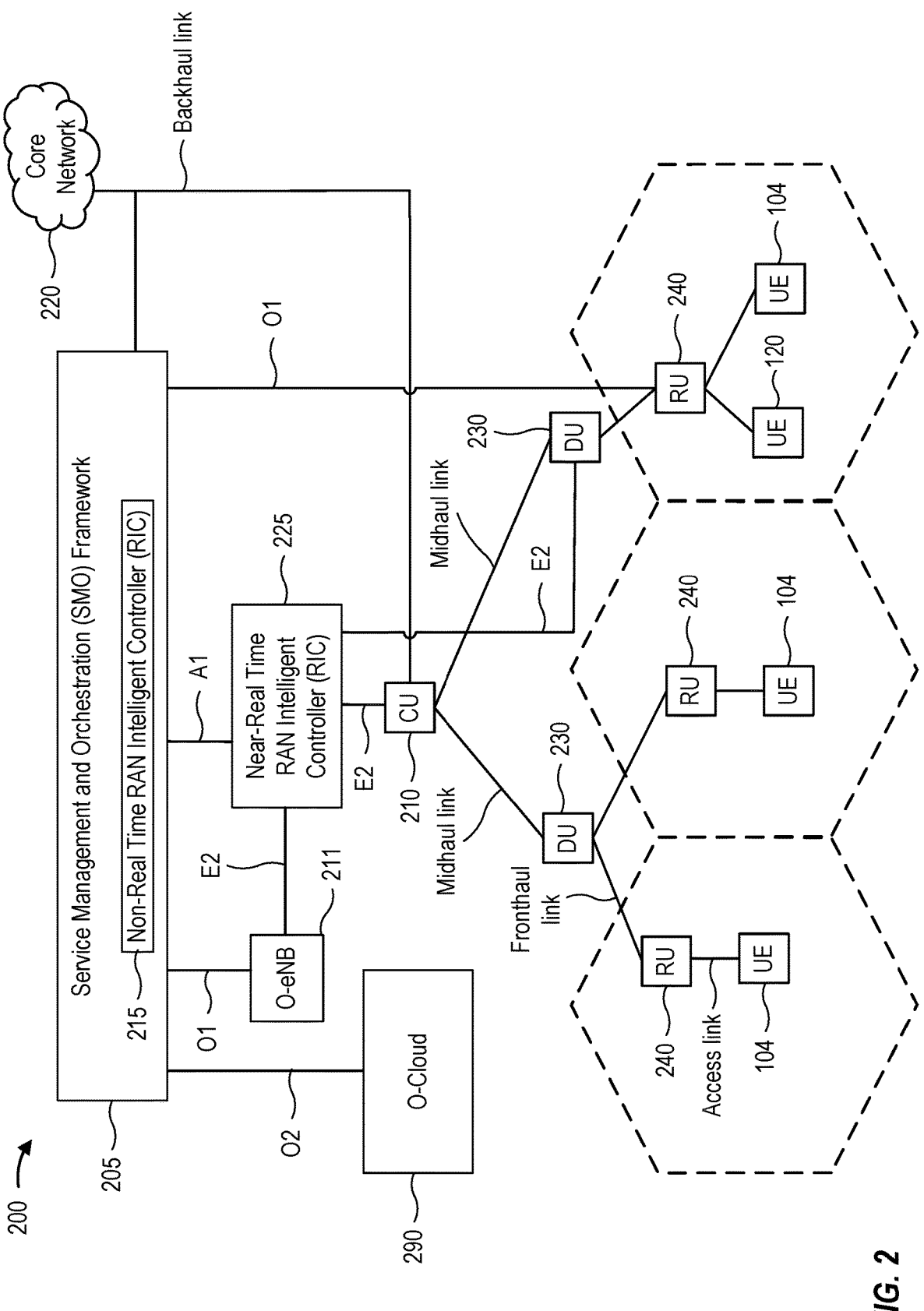
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
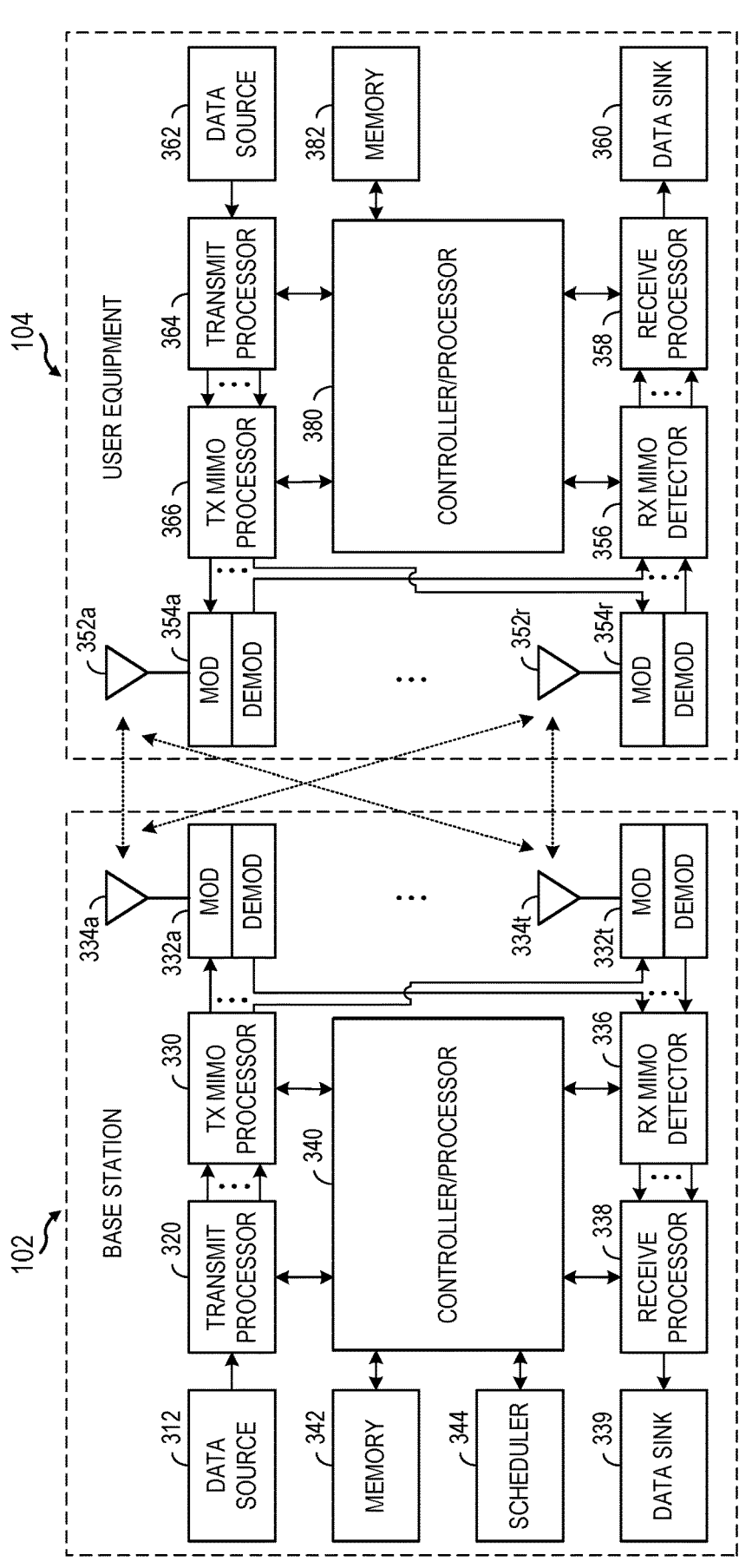
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
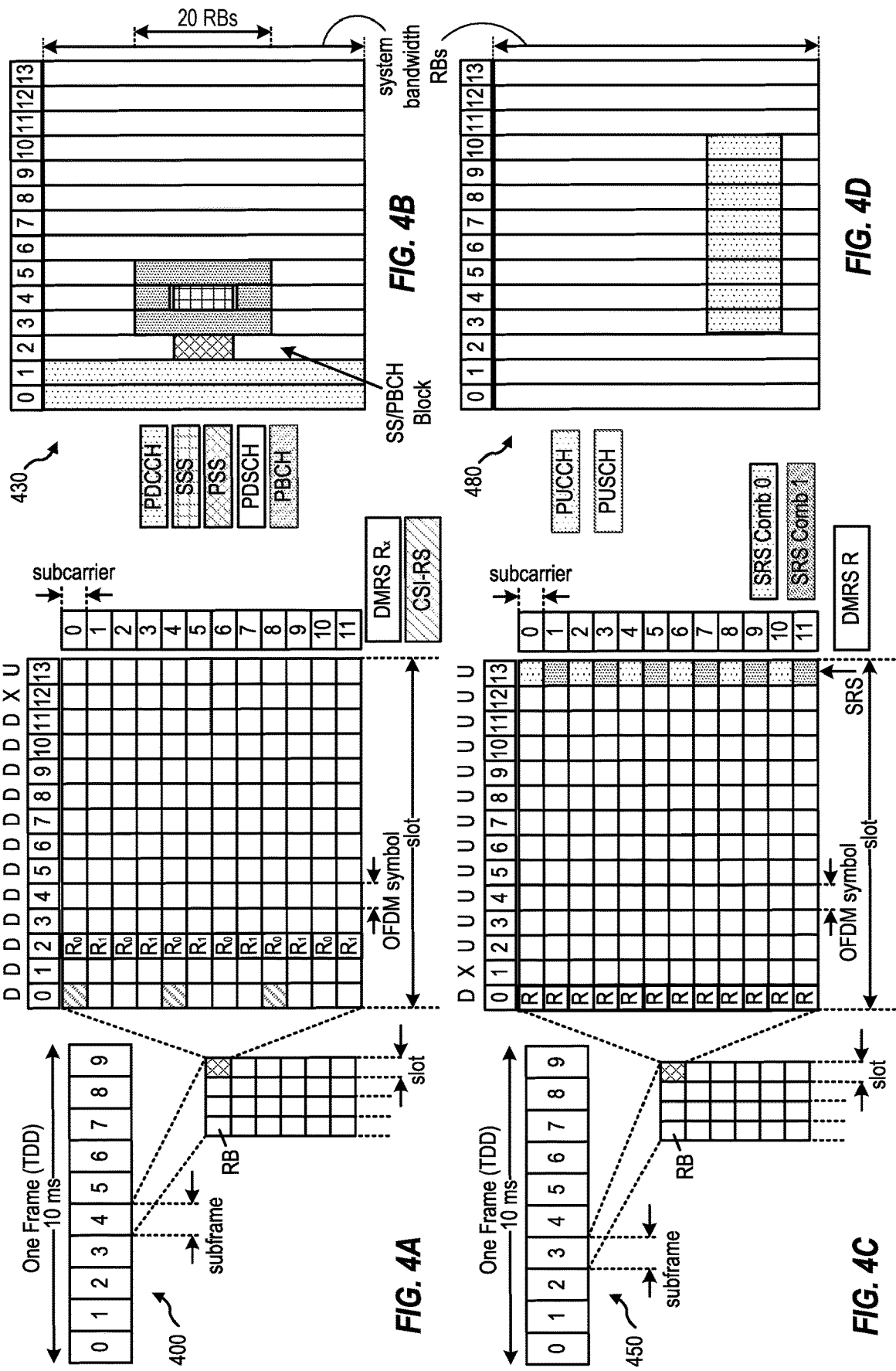
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semistatically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Wireless Energy Transfer

Radio frequency identification (RFID) is a rapidly growing technology impacting many industries due to its economic potential for inventory/asset management within warehouses, internet of things (IoT), sustainable sensor networks in factories and/or agriculture, and smart homes, to name a few example applications. RFID technology consists of RFID devices (or backscatter devices), such as transponders, or tags, that emit an information-bearing signal upon receiving an energizing signal.

In certain aspects, RFID devices may be operated without a battery. Generally, RFID devices that are operated without a battery are known as passive RFID devices. Passive RFID devices may operate by harvesting energy from received radio frequency signals (e.g., "over the air"), thereby powering reception and transmission circuitry within the RFID devices. This harvesting of energy, referred to as wireless energy transfer (WET) allows passive RFID devices to transmit information, sometimes referred to as backscatter modulated information, without the need for a local power source within the RFID device. On the other hand, in certain aspects, RFID device may be semi-passive and include on-board energy storage to supplement their ability to harvest energy from received signals (however, at higher cost).

In certain aspects, in addition to harvesting power from RF sources, energy harvesting devices may accumulate energy from other direct energy sources, such as solar energy, in order to supplement its power demands. Semi-passive energy harvesting devices may, in some cases, include power consuming RF components, such as analog to digital converters (ADCs), mixers, and oscillators.

Thus, RFID devices are a type of user equipment that provides low-cost and low-power solutions for many applications in a wireless communications system. Such devices may be very power efficient, sometimes requiring less than 0.1 mW of power to operate. Further, their relatively simple architectures and, in some cases, lack of battery, mean that such devices can be small, lightweight, and easily installed or integrated in many types of environments or host devices. Generally speaking then, RFID devices provide practical and necessary solutions to many networking applications that require, low-cost, small footprint, durable, maintenance-free, and long lifespan communications devices. For example, RFID devices may be configured as long endurance industrial sensors, which mitigates the problems of replacing batteries in and around dangerous machinery.

Wireless technology is increasingly useful in industrial applications, such as ultra-reliable low-latency communication (URLLC) and machine type communication (MTC). In such domains, and others, it is desirable to support devices (e.g., passive RFID tags) that are capable of harvesting energy from wireless energy sources (e.g., in lieu of or in combination with a battery or other energy storage device, such as a capacitor), such as RF signals, thermal energy, solar energy, and the like.

In general, wireless devices that do not have their own power source, but rather harvest and store energy from RF transmissions from other devices, may be referred to herein as zero power (ZP) RF devices. Examples of such devices include ZP Internet of Things (ZP-IoT) devices. One example of such devices are passive internet of things (PIoT) devices, that rely on passive communication technologies, such as backscatter communication. Backscatter communication generally refers to a mechanism that allows certain types of wireless nodes, often referred to as RF tags, to communicate without active RF components. In a typical scenario, an RF tag obtains (harvests) energy from an RF transmission from a reader and is also able to modulate and reflect the signals back to the reader (hence, the term backscatter). The signal reflection typically results from designed mismatch between the antenna and the load impedance at the WTD. In some cases, the load impedance can be varied to modulate the reflected signal with information bits the reader can recover by demodulating the reflected signals.

Overview of Synchronization Signals (SSs)

As noted above, synchronization signals (SSs) are generally used for initial time and frequency synchronization. In some cases, SSs may be used for identifying a physical cell identifier (ID) (PCI) of a cell. For example, new radio (NR) supports 1008 PCI which are organized into $$336 \ (N_{ID}^{(1)})$$

groups of $$3 \ (N_{ID}^{(2)}).$$

In some cases, secondary synchronization signals (SSSs) may be used for completing reference signal (RS) receive power (RSRP), RS receive quality (RSRQ), and signal to interference plus noise ratio (SINR) measurements. An SSS may also be used as an additional demodulation RS (DMRS) for a physical broadcast channel (PBCH).

Primary SS (PSS) and SSS are generally sequences of 127 bi-phase shift keying (BPSK) symbols, which may be based on an m-sequence. In some cases, for example, a PSS may be generated by applying 1 of 3 cyclic shifts to the length-127 sequence (cyclic shifts of 0, 43 and 86 depending on $$N_{ID}^{(2)}),$$

and an SSS may be generated as a product of 2 sequences. For example, one of the two sequences may be generated by applying a cyclic shift m0 which may be determined by $$N_{ID}^{(2)} \text{ and } N_{ID}^{(1)},$$

while the other sequence may be generated by applying a cyclic shift m1 which may be determined by $$N_{ID}^{(1)}.$$

Figure 5:
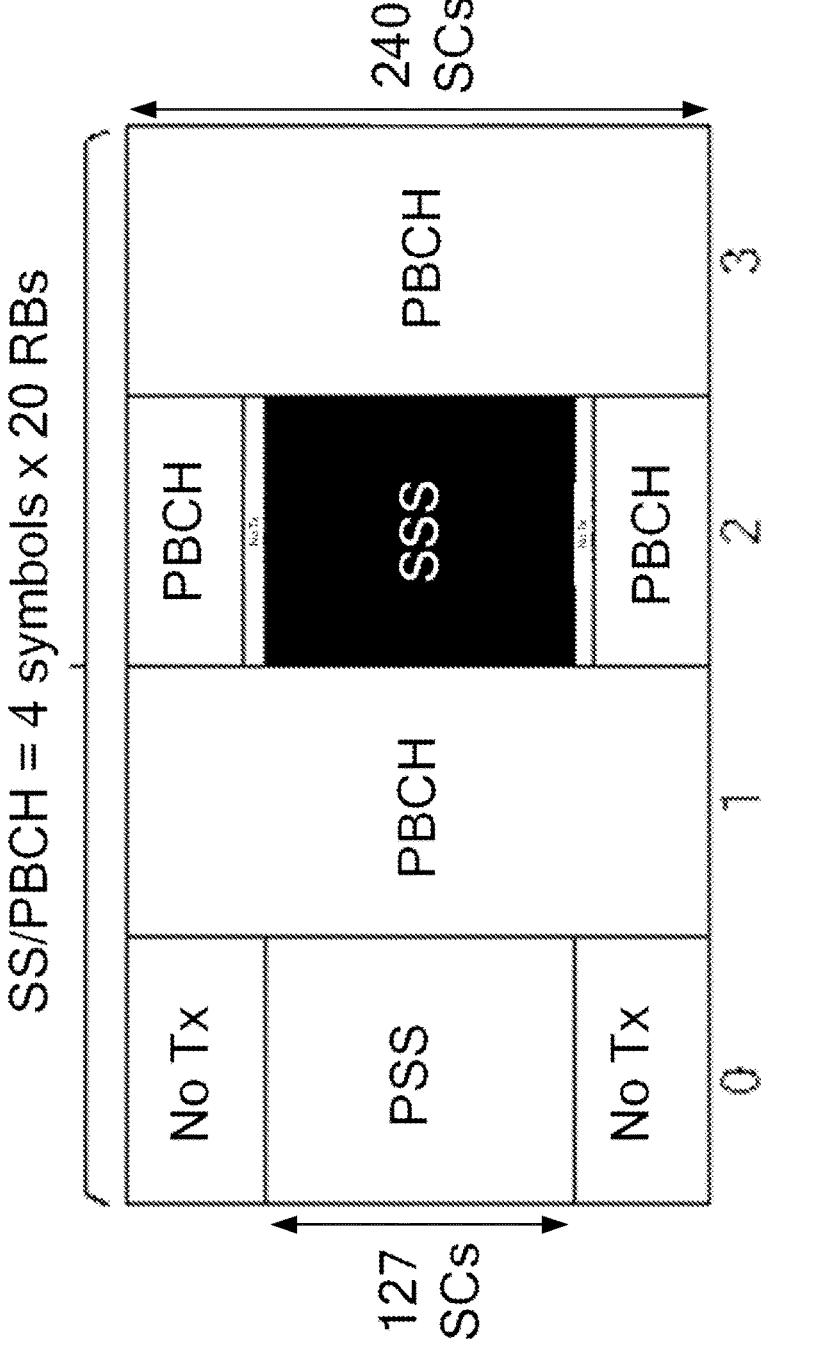
FIG. 5 depicts an example resource allocation for a synchronization signal (SS)/physical broadcast channel (PBCH) block.

FIG. 5 depicts an example time/frequency resource allocation 500 for an SSB, including a PSS and SSS. As illustrated, the SSB may span 4 symbols in the time domain and 20 resource blocks (RBs) in the frequency domain. An RB occupies 12 consecutive subcarriers (SCs) in the frequency domain (e.g., irrespective of numerology) and 1 slot in the time domain. For example, the PBCH in symbol 1 (and symbol 3) occupies 20 RBs=240 SCs. As illustrated, the primary SS (PSS) may occupy 127 SCs.

SSs may be transmitted periodically in subframes (SFs) of frames (e.g., 10 ms frames). For example, as illustrated in the example 600 f=if FIG. 6, a NarrowBand-Internet of Things (NB-IoT) PSS (NPSS) 602 may be transmitted in subframe 5 (SF=5) of a 10 ms frame using the last 11 OFDM symbols. As illustrated, an NB-IoT SSS (NSSS) 604 may be transmitted in subframe 9 SF #9 every 20 ms using the last 11 OFDM symbols. Thus, as shown, the NSSS may only be transmitted in even numbered frames since it is transmitted every 20 ms.

Figure 6:
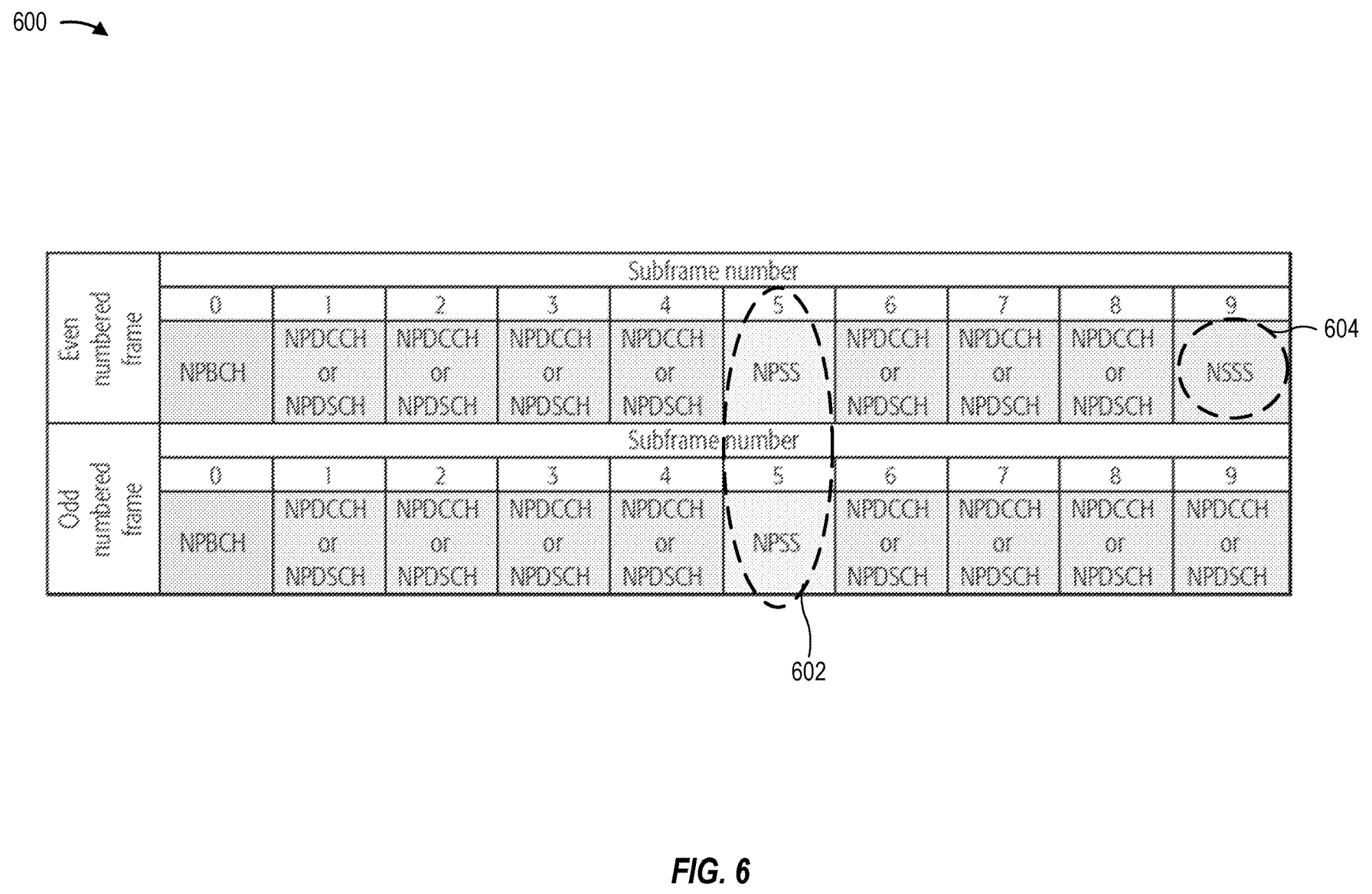

As illustrated in FIG. 6, an NB-IoT PBCH (NPBCH) may be transmitted in subframe 0 (SF #0) of a 10 ms frame (e.g., each 10 ms frame). As illustrated, an NB-IoT PDCCH (NPDCCH) or NB-IoT PDSCH (NPDSCH) may be transmitted in remaining subframes that are not allocated to NPSS, NSSS, or NPBCH transmissions.

As noted above, physical layer (PHY) designs of NPSS and NSSS may be intended to be common for all deployment scenarios. For example, there may be no assumptions regarding cell-specific reference signals (CRSs) for standalone and guard-band deployment. For in-band deployment, an NPSS/NSSS transmission may be punctured if a CRS is present. In some cases, the first three symbols are excluded to avoid impact to legacy control region as in the in-band deployment, which may impact the ability to use the NPSS/NSSS for time and frequency synchronization.

Aspects Related to Timing Synchronization Signals
(TSSs) and Frequency Synchronization Signals
(FSSs)

Aspects of the present disclosure provide synchronization signal (SS) mechanisms that may be suitable for narrowband devices. According to certain aspects, a first SS, referred to as a frequency SS (FSS), may be used to tune an oscillator frequency (e.g., carrier frequency offset-CFO) calibration, while a second SS, referred to as a time SS (TSS), may be used for timing acquisition.

Figure 7:
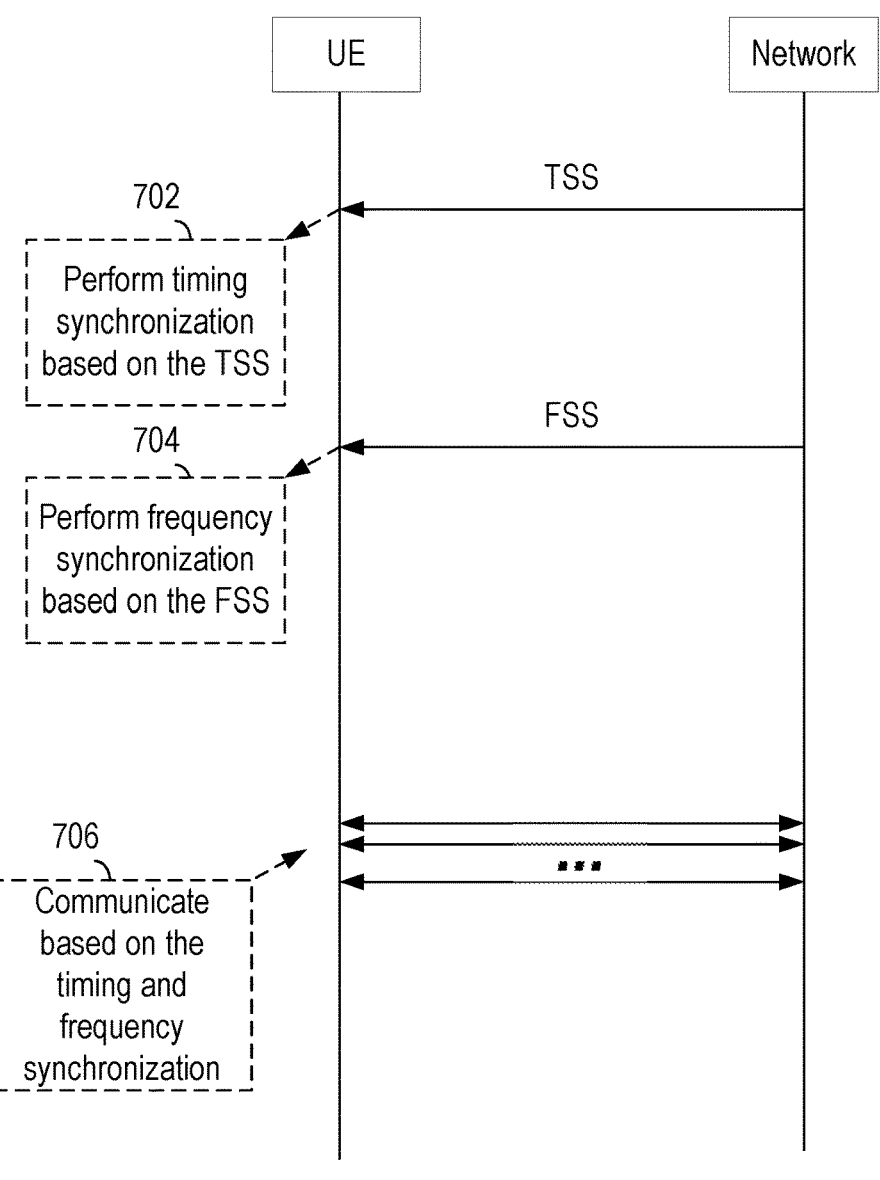
FIG. 7 depicts a call flow diagram illustrating techniques for using a timing SS (TSS) and a frequency SS (FSS), in accordance with certain aspects of the present disclosure.

Techniques for using a TSS and FSS, in accordance with certain aspects of the present disclosure, may be understood with reference to the call flow diagram 700 of FIG. 7. In some aspects, the UE shown in FIG. 7 may be an example of the UE 104 depicted and described with respect to FIGS. 1 and 3. In some aspects, the network entity shown in FIG. 7 may be an example of the BS 102 (e.g., a gNB) depicted and described with respect to FIGS. 1 and 3 or a disaggregated base station depicted and described with respect to FIG. 2.

As illustrated in FIG. 7, the network entity may transmit a TSS to a UE. As illustrated at 702, the UE may perform timing synchronization based on the TSS. For example, the UE may use the TSS for timing acquisition.

As illustrated in FIG. 7, the network entity may also transmit an FSS to a UE. As illustrated at 704, the UE may perform frequency synchronization based on the FSS. For example, the UE may use the FSS to tune an oscillator and perform carrier frequency offset (CFO) calibration.

As illustrated at 706, the UE may communicate with the network entity based on the timing and frequency synchronization (e.g., in accordance with the TSS and FSS). Similarly, the network entity may communicate with the UE in accordance with the TSS and FSS.

In some cases, as illustrated in FIG. 7, the TSS may be transmitted/processed before the FSS. In some cases, however, the FSS may be transmitted/processed before the TSS. In some cases, as will be discussed in greater detail below, with reference to FIG. 8, the TSS and the FSS may be transmitted/processed together as a primary synchronization signal (PSS).

In some aspects, a UE may first coarsely detect timing (e.g., based on a correlation with a TSS). In some cases, the UE may perform time acquisition without performing down conversion. Without down conversion, timing acquisition may not be impacted by CFO. In some aspects, a UE may use an FSS for oscillator calibration. As noted above, frequency calibration may be performed or achieved after or before timing synchronization.

In some aspects, an FSS may be a simple continuous wave (CW) signal having a frequency, f0. In some aspects, f0 may be compared with the UE's oscillator frequency in order for the UE to perform frequency synchronization. In some aspects, codes (e.g., tuning codes) may be generated in order to achieve frequency synchronization based on a phase difference between f0 and local signals (e.g., signals generated at/by the UE).

According to certain aspects, an FSS and a TSS may be frequency domain multiplexed (FDM). In other words, TSS transmission and FSS transmission may be separated in the frequency domain. This approach may increase UE complexity in order to process signals in a wider frequency range than if the FSS and TSS were set in the same narrowband.

Figures 8A, 8B, 8C:
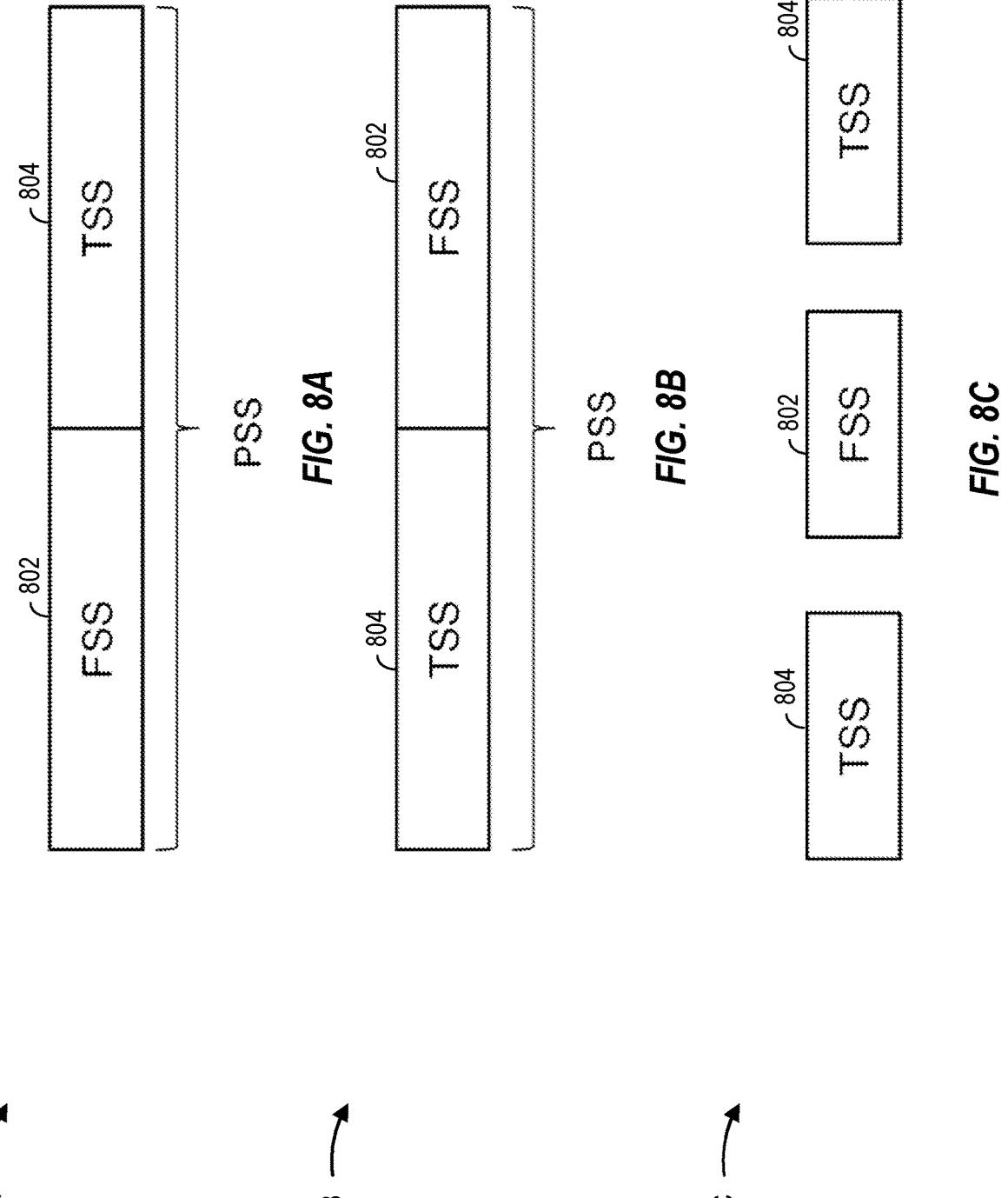
FIGS. 8A and 8B depicts example structures for processing an FSS and a TSS together as a PSS, in accordance with certain aspects of the present disclosure.
FIG. 8C depicts an example structure for processing FSSs and TSSs separately, in accordance with certain aspects of the present disclosure.

As noted above, according to certain aspects, a TSS and an FSS may be transmitted and/or processed together as a PSS, which may be repeated with a periodicity (e.g., which may be configurable). FIGS. 8A and 8B depicts example structures for processing an FSS and a TSS together as a PSS, in accordance with certain aspects of the present disclosure. For example, as illustrated in the example diagram 800A of FIG. 8A, in some aspects, an FSS may be transmitted before a TSS (with or without a processing time gap). In some aspects, as illustrated in the example diagram 800B of FIG. 8B, a TSS may be transmitted before an FSS (e.g., with or without a processing time gap).

According to certain aspects, a TSS and an FSS may be repeated separately (e.g., with their periodicities configured separately). For example, as illustrated in in the example diagram 800C of FIG. 8C, FSSs and TSSs may be sent separately (e.g., with one sent more frequently than the other).

As illustrated, in some aspects, a TSS may be transmitted before an FSS (e.g., and repeated with a configured periodicity). In some aspects, an FSS may be transmitted before a TSS (e.g., and repeated with a configured periodicity). In some cases, two different "channels" may be utilized for transmitting/processing of TSSs and FSSs (e.g., similar to physical channels and logical channels used for Global System for Mobile Communication (GSM)).

FIG. 9 depicts an example frame allocation 900 for FSS 902, TSSs 904, and a PBCH 906 transmissions, in accordance with certain aspects of the present disclosure.

According to certain aspects, continuous wave (CW) transmit opportunities may be reserved for FSS transmissions. In some cases, CW opportunities may be used as FSSs, which may allow a UE (e.g., an ultra-light IoT device) to perform frequency synchronization.

According to certain aspects, a UE may harvest energy from a CW/FSS transmission during a synchronization procedure (e.g., based on the FSS). In some cases, CW and/or FSS may be transmitted in fixed time slots. In the illustrated example, FSS is periodically transmitted in time slot 0 (TSO) of a frame.

In some cases, a UE may assume a CW/FSS is transmitted at a default periodicity. In the illustrated example, CW/FSS is transmitted with a periodicity of 10 frames: in frame number 0 (FN #0), FN #10, and every 10$^{th}$ frame thereafter. In some cases, dedicated signaling or a cell-specific system information block (SIB) or master information block (MIB) may indicate an FSS periodicity. In some cases, the dedicated signaling may override a default periodicity.

In some aspects, FSS and TSS transmissions may be time division duplexed (TDD'd). For example, in some aspects, downlink (DL) backscattering and uplink backscattering may share a same channel or frequency, but use different time resources. In some aspects, FSSs, TSSs and PBCH transmissions may be transmitted in downlink time slots (e.g., TSO may be reserved for downlink broadcast channels (BCHs)).

In some cases, extended-coverage shared channels (SCHs) may be transmitted in other time slots for UEs experiencing poor coverage and/or having suboptimal hardware. For example, a UE may have free running oscillators deployed in environments with extreme high/low temperature or high adjacent band signal power. In such cases, re-synchronization signals (RSSs) may be configured for specific UEs on demand. The RSSs may be one or more combination of FSS or TSS transmissions.

Figure 10:
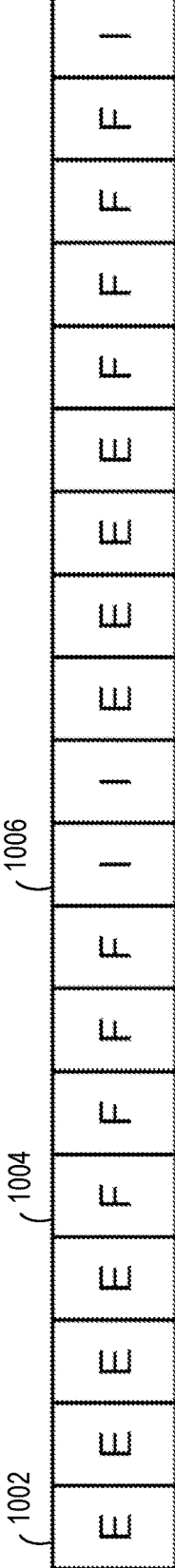
FIG. 10 depicts an example slot configuration, in accordance with certain aspects of the present disclosure.

FIG. 10 depicts an example slot configuration 1000, in accordance with certain aspects of the present disclosure. The slot configuration includes dedicated energy ("E") slots 1002, ("I") slots 1004 for transmitting information, and flexible ("F") sots 1006 that may be dynamically configured as either.

In some aspects, an FSS may be associated with every dedicated energy slot. In energy slots, a gNB may transmit energy signals for wireless energy transfer (WET). In some aspects, a UE may use any energy slot for frequency synchronization and/or energy harvesting (EH).

In some cases, a default configuration of energy slots may be assumed by a UE when it is powered on. For example, the default configuration may dictate that at least one energy slot is to occur within 40 ms. In some cases, additional energy slots may be configured by a gNB and broadcast in PBCH. In some cases, a UE may detect additional energy slots using various channel sensing methods, such as detecting sinusoid bursts (e.g., correlation, or notch filtering).

In some aspects, a gNB may transmit a CW in energy slots allowing FSS and/or EH. In some aspects, a gNB may transmit a power-optimized waveform (PoW) with a multi-sine signal in E slots in a frequency band at a fixed frequency offset to the carrier frequency (e.g., $f_c \pm f_1$ and $f_c \pm f_2$, . . . ). In some aspects, $f_1$ and $f_2$ may be large enough for a UE to perform filtering so that a single sine wave may be used for frequency synchronization. In some cases, a UE may scan the signal strength of all of the frequencies in the band and choose the strongest frequency as a FSS to tune the oscillator.

Figure 11:
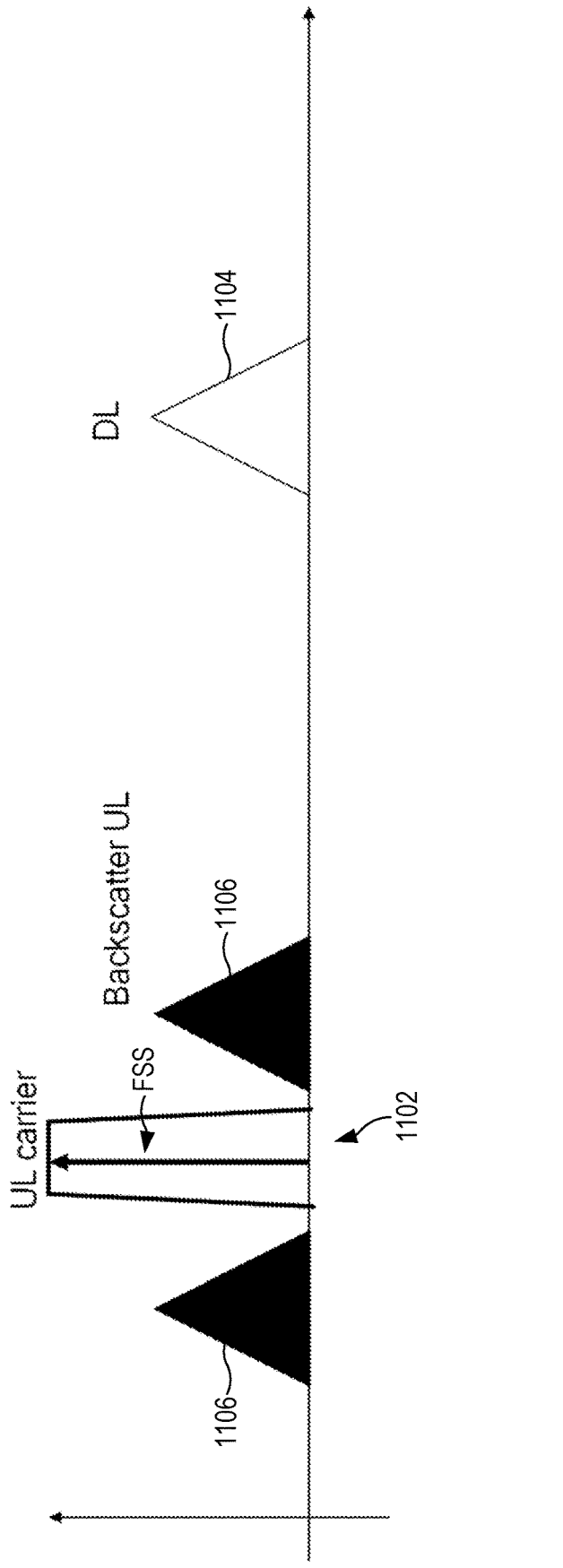
FIG. 11 depicts an example timing diagram, in accordance with certain aspects of the present disclosure.

In systems supporting half-duplex (HD) frequency division duplexing (FDD), as illustrated in the example timeline 1100 of FIG. 11, downlink and uplink transmissions may be sent using different frequency bands: an uplink (UL) carrier 1102 and downlink (DL) carrier 1104. In such systems, as illustrated in FIG. 11, a gNB may still transmit a CW signal on the uplink carrier 1102, gNB may still transmit CW so that UE can backscatter. In the illustrated example, the UE may backscatter on one or both frequencies 1106 that are offset from the UL carrier 1102.

In some aspects, a UE may use a CW transmission on the uplink carrier as an FSS. For example, a CW transmitted at uplink carrier frequency 1102 may be used as an FSS (e.g., which may be always on). In some aspects, a UE equipped with a backscatter radio may apply a frequency shift when transmitting UL information (e.g., and backscatter on one or both bands 1106). In some cases, backscatter signal spectrum may not overlap with an uplink carrier (e.g., a minimum guard band may be reserved between UL carrier and UL spectrum). In some aspects, a UE may apply a filter to obtain a pure carrier wave as an FSS (e.g., filtering out the backscattered signals from other UEs). In some cases, there may be a dedicated time slot (TS) for FSS (e.g., other UEs may not backscatter in the dedicated TS).

As illustrated in the example timeline 1200 of FIG. 12, a UE may use a CW transmission on an uplink carrier 1206 and/or a downlink carrier 1204 as an FSS. For example, in some cases, uplink band signals may be represented by the following equation:

$$A1 \cos(2\pi f_{FSS, UL}) + s_{backscattering, UL}(t) \cos(2\pi f_{c, UL}).$$

In some cases, DL band signals may be represented by the following equation:

$$A2 \cos(2\pi f_{FSS, DL}) + s_{DL}(t) \cos(2\pi f_{c, DL}).$$

In some cases, whether an uplink carrier or downlink carrier is used for FSS may be dependent on signal strength. In some cases, an FSS on an uplink carrier and/or a downlink carrier may be transmitted on dedicated time slots.

Figure 13:
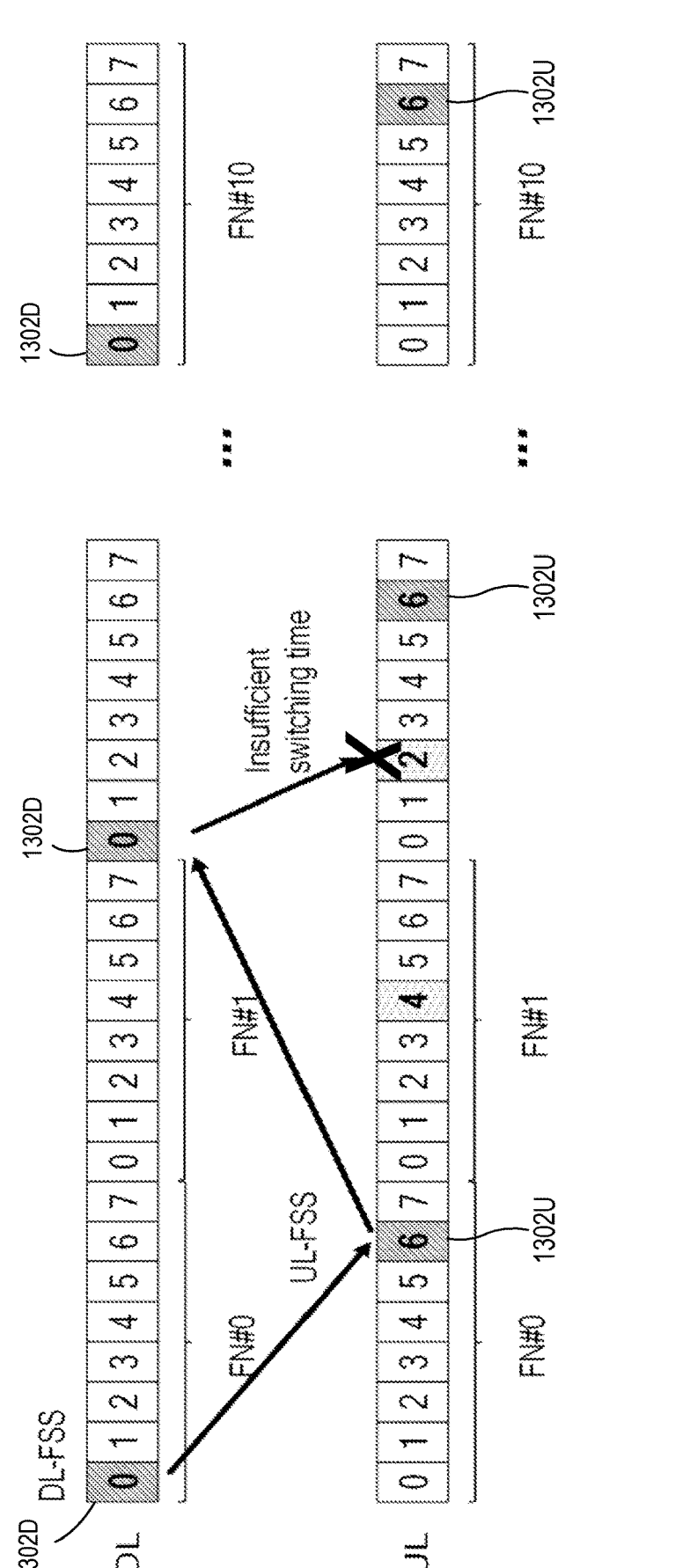
FIG. 13 depicts an example timing diagram with uplink and downlink synchronization signals, in accordance with certain aspects of the present disclosure.

According to certain aspects, for half-duplex FDD, UL-FSSs and DL-FSSs may be transmitted with a same periodicity, with an offset applied so that the UE has sufficient time to switch between UL and DL. In the example timeline 1300 illustrated in the example timeline 1300 of FIG. 13, an offset with a duration of 5 time slots may allow for sufficient switching time between DL-FSS 1302D at TSO and UL-FSS 1302U at TS6. As illustrated, an UL FSS at TS2 after a DL FSS 1302D at TSO may provide insufficient switching time.

According to certain aspects, UL-FSS and DL-FSS may be transmitted with different periodicities. In some cases, a UE may determine which of the DL-FSS or UL-FSS is chosen for frequency synchronization. In some cases, the (UL or DL) FSS transmission that is not chosen may be skipped.

Figure 14:
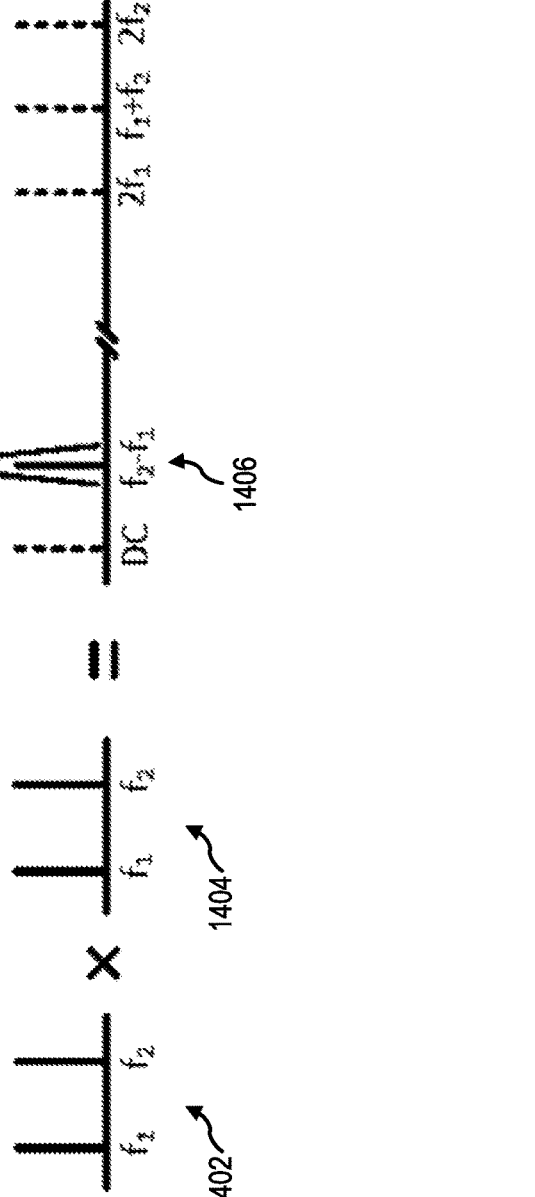
FIG. 14 depicts an example timing diagram for two-tone synchronization signals, in accordance with certain aspects of the present disclosure.

As illustrated in the timing diagram 1400 of FIG. 14, two-tone signals may be used as FSSs. In such aspects, as illustrated at 1402 and 1404, an FSS may be comprised of a sine wave at frequencies $f_1$ and $f_2$. The frequency difference $f_2 - f_1$ may be relatively small (e.g., 1 kHz-40 MHz).

In some aspects, $f_2 - f_1$ may represent the frequency of a UE oscillator and the signal may be used to calibrate the local oscillator frequency. For example, in some cases, as illustrated at 1406, a UE may multiply the received FSS and filter out the frequency at $f_2 - f_1$ for calibration. In such cases, an analog-to-digital converter (ADC) or band-band processing may not be required for frequency calibration. In such cases, frequency calibration may be achieved using cheap analog components.

In some aspects, a UE may fall back to a different method for frequency synchronization if one of the tones encounters deep fading. In order to be more robust against deep fading, an FSS may be comprised of three or more tones (e.g., $f_0, f_1$, and $f_2$, which may be equally spaced with the frequency being the UE oscillator frequency). For a three-tone scenario, for example, a UE may choose the strongest two-tone combination for frequency calibration. In such a scenario, the failure rate may be $3p^2 - 2p^3$ (e.g., assuming independent fading and a deep fading probability of p).

In some cases, a UE may use envelope detection circuitry for frequency calibration. In such cases, extraction of the low-frequency $f_2 - f_1$ may be achieved using ultra-low power, passive, off-the-shelf components (e.g., consuming only 6.6 μW).

Figure 15:
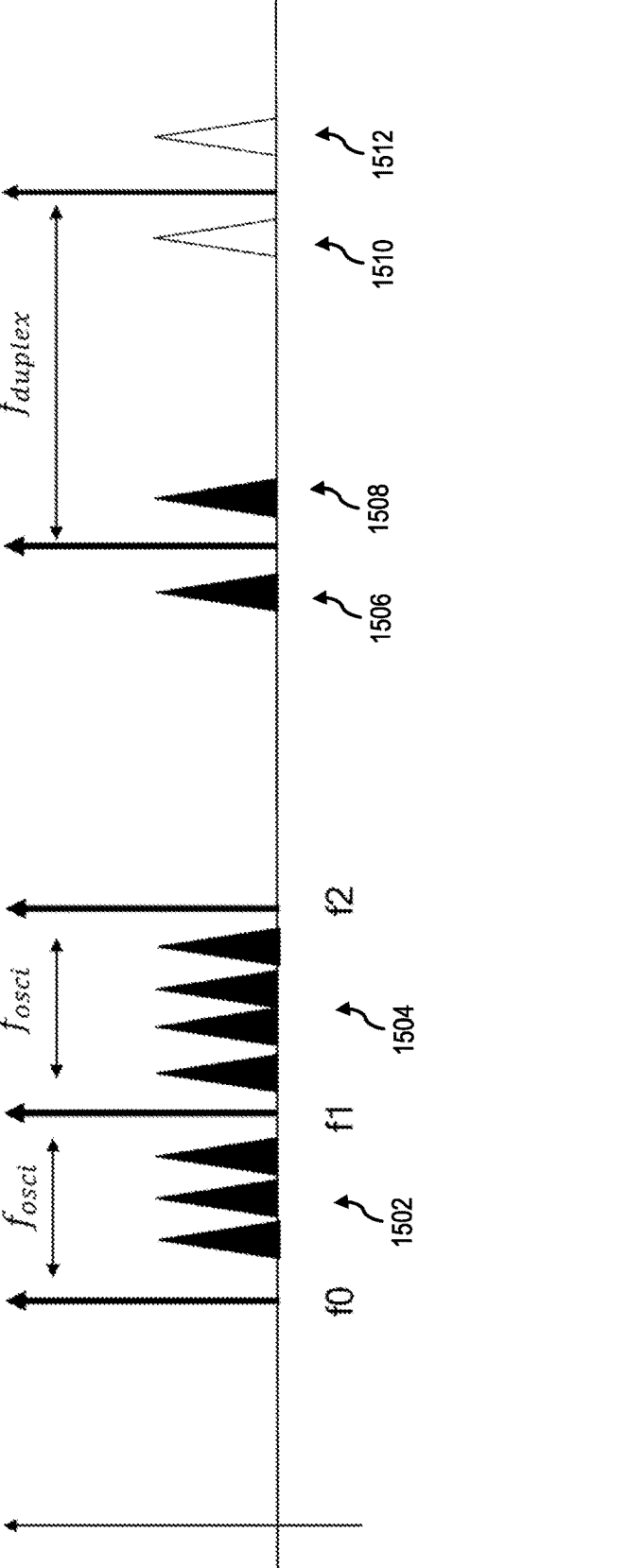
FIG. 15 depicts another example timing diagram for two-tone synchronization signals, in accordance with certain aspects of the present disclosure

As illustrated in the example timing diagram 1500 of FIG. 15, an FSS may be transmitted (e.g., at $f_0, f_1$, and $f_2$) using several CW (on a carrier frequency) of UL/DL channels. In such cases, the UL/DL channels with the CW may be separated by $f_{osci}$. In some aspects, at FSS occasions, only CWs may be transmitted, allowing UE to extract the beat frequency.

In some aspects, as shown at 1502-1512, backscattering may be performed based on a frequency shift around $f_0$, $f_1$, and $f_2$ to facilitate the frequency synchronization. In some aspects, a UE may also use CWs from uplink and/or downlink bands to extract the beat frequency for synchronization, where the beat frequency may be equivalent to the duplex gap ($f_{duplex}$).

Example Operations

Figure 16:
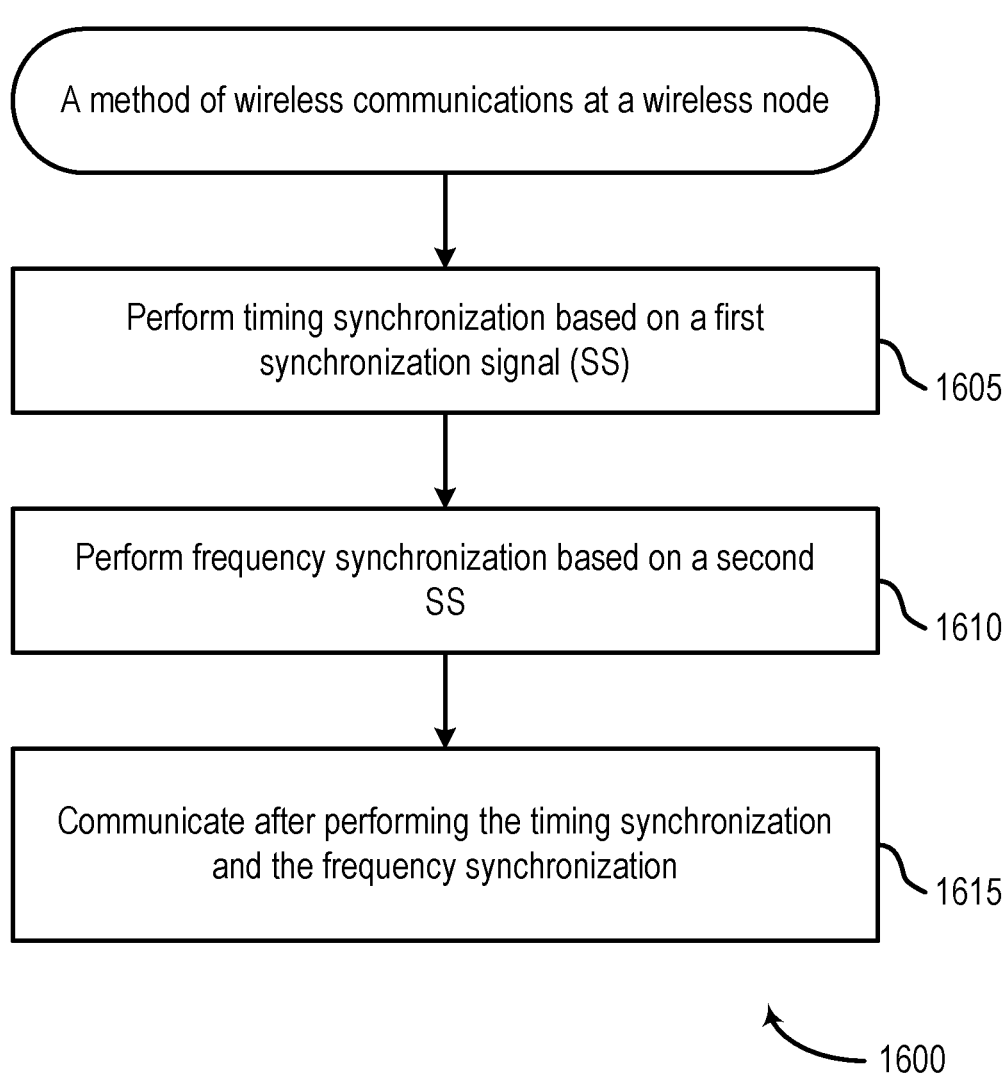
FIG. 16 depicts a method for wireless communications.

FIG. 16 shows an example of a method 1600 of wireless communications at a wireless node, such as a UE 104 of FIGS. 1 and 3.

Method 1600 begins at step 1605 with performing timing synchronization based on a first synchronization signal (SS). In some cases, the operations of this step refer to, or may be performed by, circuitry for performing and/or code for performing as described with reference to FIG. 18.

Method 1600 then proceeds to step 1610 with performing frequency synchronization based on a second SS. In some cases, the operations of this step refer to, or may be performed by, circuitry for performing and/or code for performing as described with reference to FIG. 18.

Method 1600 then proceeds to step 1615 with communicating (e.g., with a wireless device) after performing the timing synchronization and the frequency synchronization. In some cases, the operations of this step refer to, or may be performed by, circuitry for communicating and/or code for communicating as described with reference to FIG. 18.

In some aspects, the second SS comprises at least one of a continuous wave (CW) signal or a power-optimized waveform (PoW) signal.

In some aspects, performing frequency synchronization is based on a phase difference between the second SS and a local oscillator frequency.

In some aspects, the first SS and second SS are obtained via separate frequencies.

In some aspects, the method 1600 further includes processing the first SS and the second SS together as a primary SS (PSS) that is repeated with a periodicity. In some cases, the operations of this step refer to, or may be performed by, circuitry for processing and/or code for processing as described with reference to FIG. 18.

In some aspects, at least one of the first SS or the second SS is repeated with a configurable periodicity.

In some aspects, the second SS is obtained in one or more fixed time slots, time slots with a default periodicity, or time slots with a configured periodicity.

In some aspects, the method 1600 further includes obtaining signaling, from the wireless device, indicating the configured periodicity. In some cases, the operations of this step refer to, or may be performed by, circuitry for obtaining and/or code for obtaining as described with reference to FIG. 18.

In some aspects, the second SS is time division multiplexed with one or more other types of signals obtained in other time slots, and the method further comprises demultiplexing the one or more other types of signals to obtain the second SS.

In some aspects, the method 1600 further includes outputting, for transmission, signaling to request transmission of at least one of the first SS or second SS. In some cases, the operations of this step refer to, or may be performed by, circuitry for outputting and/or code for outputting as described with reference to FIG. 18.

In some aspects, the second SS is obtained in at least one slot configured for wireless energy transfer (WET).

In some aspects, the method 1600 further includes harvesting energy via wireless energy transfer (WET) from the second SS, wherein the communicating with the wireless device comprises using the harvested energy. In some cases, the operations of this step refer to, or may be performed by, circuitry for harvesting and/or code for harvesting as described with reference to FIG. 18.

In some aspects, the method 1600 further includes measuring signal strengths of signals at multiple frequencies. In some cases, the operations of this step refer to, or may be performed by, circuitry for measuring and/or code for measuring as described with reference to FIG. 18.

In some aspects, the method 1600 further includes selecting the second SS for performing the frequency synchronization, based on the measurement. In some cases, the operations of this step refer to, or may be performed by, circuitry for selecting and/or code for selecting as described with reference to FIG. 18.

In some aspects, the communication comprises downlink receptions on a first frequency band and uplink transmissions on a second frequency band, at least the second SS comprises a continuous wave (CW) signal, and the method further comprises obtaining the CW signal on at least one of the first frequency band or the second frequency band.

In some aspects, the method 1600 further includes measuring signal strengths of a first CW signal on the first frequency band and a second CW signal on the second frequency band. In some cases, the operations of this step refer to, or may be performed by, circuitry for measuring and/or code for measuring as described with reference to FIG. 18.

In some aspects, the method 1600 further includes selecting one of the first CW signal or second CW signal as the second SS based on the measuring. In some cases, the operations of this step refer to, or may be performed by, circuitry for selecting and/or code for selecting as described with reference to FIG. 18.

In some aspects, the second SS comprises at least one of: a first sine wave at a first frequency, or at least a second sine wave at a second frequency.

In some aspects, the frequency synchronization is performed based on a difference between the second frequency and the first frequency.

In some aspects, the method 1600 further includes outputting, for transmission, a backscattered signal based on a frequency shift relative to at least one of the first frequency or second frequency. In some cases, the operations of this step refer to, or may be performed by, circuitry for outputting and/or code for outputting as described with reference to FIG. 18.

Figure 18:
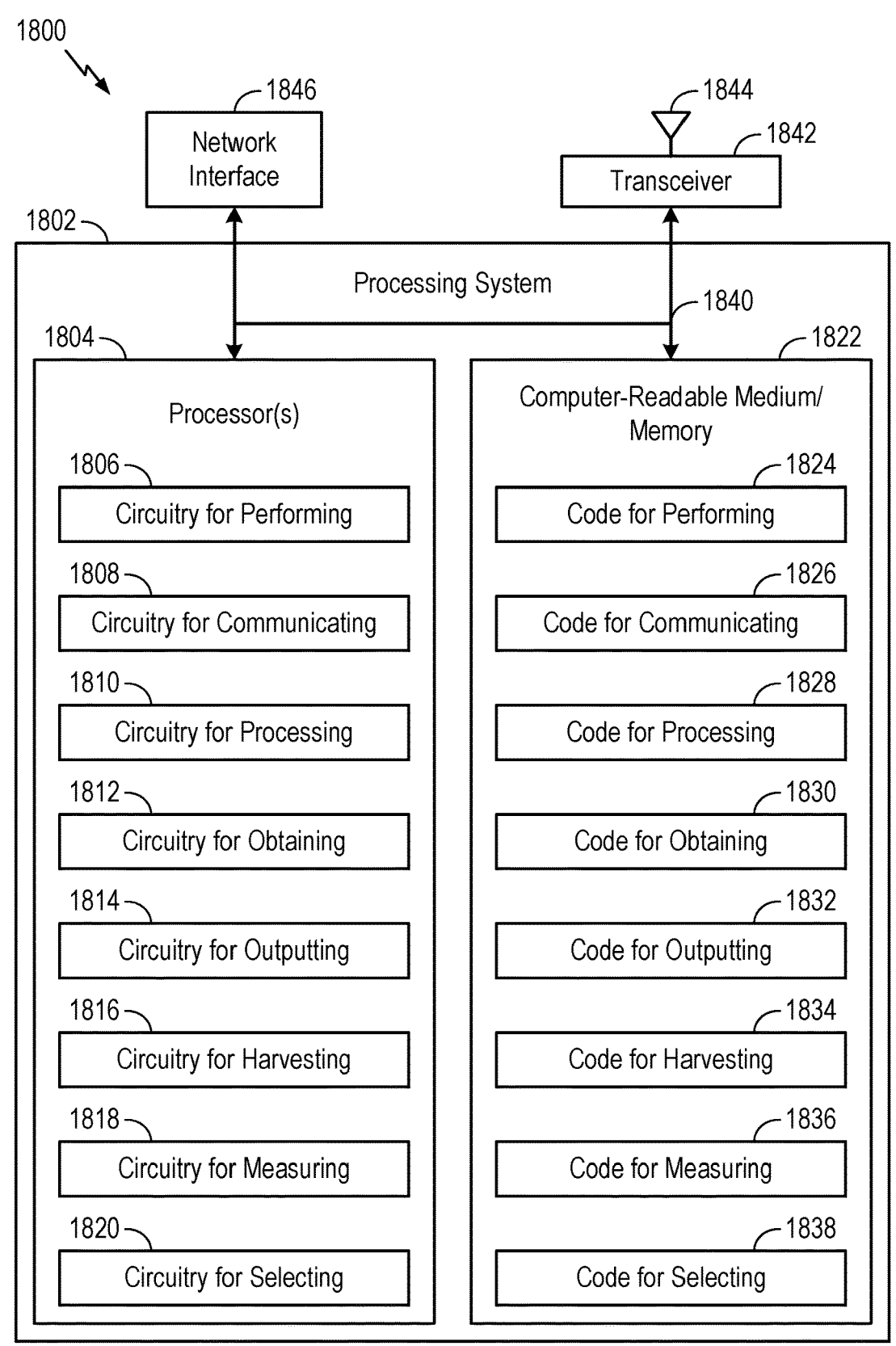
FIG. 18 depicts aspects of an example communications device.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

Figure 17:
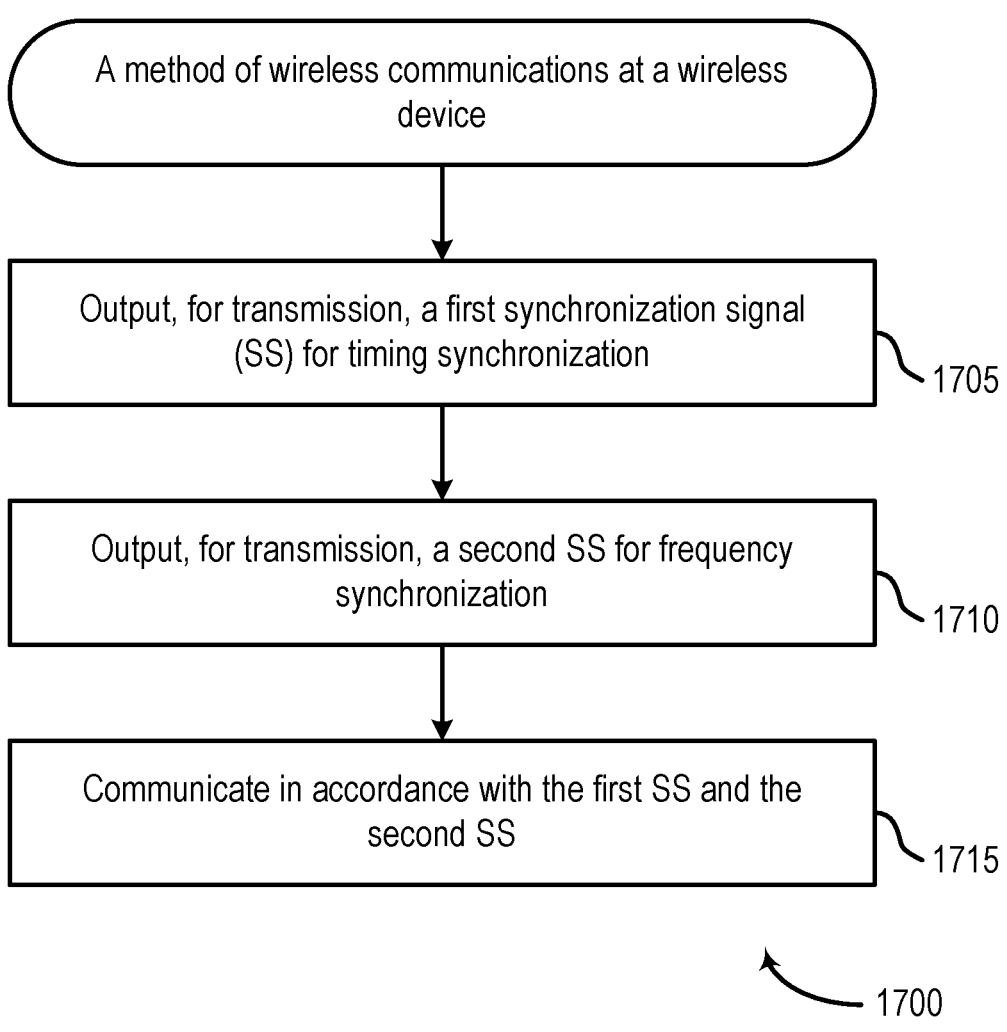
FIG. 17 depicts a method for wireless communications.

FIG. 17 shows an example of a method 1700 of wireless communications at a wireless device, such as a BS 102 of FIGS. 1 and 3, or a disaggregated base station as discussed with respect to FIG. 2.

Method 1700 begins at step 1705 with outputting, for transmission, a first synchronization signal (SS) for timing synchronization. In some cases, the operations of this step refer to, or may be performed by, circuitry for outputting and/or code for outputting as described with reference to FIG. 18.

Method 1700 then proceeds to step 1710 with outputting, for transmission, a second SS for frequency synchronization. In some cases, the operations of this step refer to, or may be performed by, circuitry for outputting and/or code for outputting as described with reference to FIG. 18.

Method 1700 then proceeds to step 1715 with communicating (e.g., with a wireless node) in accordance with the first SS and the second SS. In some cases, the operations of this step refer to, or may be performed by, circuitry for communicating and/or code for communicating as described with reference to FIG. 18.

In some aspects, the second SS comprises at least one of a continuous wave (CW) signal or a power-optimized waveform (PoW) signal.

In some aspects, the first SS and second SS are output, for transmission, via separate frequencies.

In some aspects, the first SS and the second SS are output, for transmission, together as a primary SS (PSS) that is repeated with a periodicity.

In some aspects, at least one of the first SS or the second SS is repeated with a configurable periodicity.

In some aspects, the second SS is output, for transmission, in one or more fixed time slots, time slots with a default periodicity, or time slots with a configured periodicity.

In some aspects, the method 1700 further includes outputting, for transmission, signaling indicating the configured periodicity. In some cases, the operations of this step refer to, or may be performed by, circuitry for outputting and/or code for outputting as described with reference to FIG. 18.

In some aspects, the second SS is time division multiplexed with one or more other types of signals obtained in other time slots.

In some aspects, the method 1700 further includes obtaining signaling to request transmission of at least one of the first SS or second SS. In some cases, the operations of this step refer to, or may be performed by, circuitry for obtaining and/or code for obtaining as described with reference to FIG. 18.

In some aspects, the second SS is output, for transmission, in at least one slot configured for wireless energy transfer (WET).

In some aspects, the communication comprises downlink transmissions on a first frequency band and uplink receptions on a second frequency band, at least the second SS comprises a continuous wave (CW) signal, and the method further comprises outputting, for transmission, the CW signal on at least one of the first frequency band or the second frequency band.

In some aspects, the second SS comprises at least one of: a first sine wave at a first frequency, or at least a second sine wave at a second frequency.

In some aspects, the method 1700 further includes obtaining a backscattered signal based on a frequency shift relative to at least one of the first frequency or second frequency. In some cases, the operations of this step refer to, or may be performed by, circuitry for obtaining and/or code for obtaining as described with reference to FIG. 18.

In one aspect, method 1700, or any aspect related to it, may be performed by an apparatus, such as communications device 1800 of FIG. 18, which includes various components operable, configured, or adapted to perform the method 1700. Communications device 1800 is described below in further detail.

Note that FIG. 17 is just one example of a method, and other methods including fewer, additional, or alternative steps are possible consistent with this disclosure.

Example Communications Device(s)

FIG. 18 depicts aspects of an example communications device 1800. In some aspects, communications device 1800 is a user equipment, such as UE 104 described above with respect to FIGS. 1 and 3. In some aspects, communications device 1800 is a network entity, such as BS 102 of FIGS. 1 and 3, or a disaggregated base station as discussed with respect to FIG. 2.

The communications device 1800 includes a processing system 1802 coupled to the transceiver 1842 (e.g., a transmitter and/or a receiver). In some aspects (e.g., when communications device 1800 is a network entity), processing system 1802 may be coupled to a network interface 1846 that is configured to obtain and send signals for the communications device 1800 via communication link(s), such as a backhaul link, midhaul link, and/or fronthaul link as described herein, such as with respect to FIG. 2. The transceiver 1842 is configured to transmit and receive signals for the communications device 1800 via the antenna 1844, such as the various signals as described herein. The processing system 1802 may be configured to perform processing functions for the communications device 1800, including processing signals received and/or to be transmitted by the communications device 1800.

The processing system 1802 includes one or more processors 1804. In various aspects, the one or more processors 1804 may be representative of one or more of receive processor 358, transmit processor 364, TX MIMO processor 366, and/or controller/processor 380, as described with respect to FIG. 3. In various aspects, one or more processors 1804 may be representative of one or more of receive processor 338, transmit processor 320, TX MIMO processor 330, and/or controller/processor 340, as described with respect to FIG. 3. The one or more processors 1804 are coupled to a computer-readable medium/memory 1822 via a bus 1840. In certain aspects, the computer-readable medium/memory 1822 is configured to store instructions (e.g., computer-executable code) that when executed by the one or more processors 1804, cause the one or more processors 1804 to perform the method 1600 described with respect to FIG. 16, or any aspect related to it; and the method 1700 described with respect to FIG. 17, or any aspect related to it. Note that reference to a processor performing a function of communications device 1800 may include one or more processors 1804 performing that function of communications device 1800.

In the depicted example, computer-readable medium/memory 1822 stores code (e.g., executable instructions), such as code for performing 1824, code for communicating 1826, code for processing 1828, code for obtaining 1830, code for outputting 1832, code for harvesting 1834, code for measuring 1836, and code for selecting 1838. Processing of the code for performing 1824, code for communicating 1826, code for processing 1828, code for obtaining 1830, code for outputting 1832, code for harvesting 1834, code for measuring 1836, and code for selecting 1838 may cause the communications device 1800 to perform the method 1600 described with respect to FIG. 16, or any aspect related to it; and the method 1700 described with respect to FIG. 17, or any aspect related to it.

The one or more processors 1804 include circuitry configured to implement (e.g., execute) the code stored in the computer-readable medium/memory 1822, including circuitry for performing 1806, circuitry for communicating 1808, circuitry for processing 1810, circuitry for obtaining 1812, circuitry for outputting 1814, circuitry for harvesting 1816, circuitry for measuring 1818, and circuitry for selecting 1820. Processing with circuitry for performing 1806, circuitry for communicating 1808, circuitry for processing 1810, circuitry for obtaining 1812, circuitry for outputting 1814, circuitry for harvesting 1816, circuitry for measuring 1818, and circuitry for selecting 1820 may cause the communications device 1800 to perform the method 1600 described with respect to FIG. 16, or any aspect related to it; and the method 1700 described with respect to FIG. 17, or any aspect related to it.

Various components of the communications device 1800 may provide means for performing the method 1600 described with respect to FIG. 16, or any aspect related to it; and the method 1700 described with respect to FIG. 17, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1842 and the antenna 1844 of the communications device 1800 in FIG. 18. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1842 and the antenna 1844 of the communications device 1800 in FIG. 18. Means for performing, means for communicating, means for processing, means for obtaining, means for demultiplexing, means for outputting, means for measuring, means for selecting, means for multiplexing, means for receiving, and/or means for transmitting may include any of the various processors and/or transceivers shown in FIG. 3 or 18.

EXAMPLE CLAUSES

Implementation examples are described in the following numbered clauses:

Clause 1: A method of wireless communications at a wireless node, comprising: performing timing synchronization based on a first synchronization signal (SS); performing frequency synchronization based on a second SS; and communicating after performing the timing synchronization and the frequency synchronization.

Clause 2: The method of Clause 1, wherein the second SS comprises at least one of a continuous wave (CW) signal or a power-optimized waveform (PoW) signal.

Clause 3: The method of any one of Clauses 1-2, wherein performing frequency synchronization is based on a phase difference between the second SS and a local oscillator frequency.

Clause 4: The method of any one of Clauses 1-3, wherein the first SS and second SS are obtained via separate frequencies.

Clause 5: The method of any one of Clauses 1-4, further comprising processing the first SS and the second SS together as a primary SS (PSS) that is repeated with a periodicity.

Clause 6: The method of any one of Clauses 1-5, wherein at least one of the first SS or the second SS is repeated with a configurable periodicity.

Clause 7: The method of any one of Clauses 1-6, wherein the second SS is obtained in one or more fixed time slots, time slots with a default periodicity, or time slots with a configured periodicity.

Clause 8: The method of Clause 7, further comprising obtaining signaling indicating the configured periodicity.

Clause 9: The method of any one of Clauses 1-8, wherein: the second SS is time division multiplexed with one or more other types of signals obtained in other time slots, and the method further comprises demultiplexing the one or more other types of signals to obtain the second SS.

Clause 10: The method of any one of Clauses 1-9, further comprising outputting, for transmission, signaling to request transmission of at least one of the first SS or second SS.

Clause 11: The method of any one of Clauses 1-10, wherein the second SS is obtained in at least one slot configured for wireless energy transfer (WET).

Clause 12: The method of Clause 11, further comprising harvesting energy via wireless energy transfer (WET) from the second SS, wherein the communicating with the wireless device comprises using the harvested energy.

Clause 13: The method of any one of Clauses 1-12, further comprising: measuring signal strengths of signals at multiple frequencies; and selecting the second SS for performing the frequency synchronization, based on the measurement.

Clause 14: The method of any one of Clauses 1-13, wherein: the communication comprises downlink receptions on a first frequency band and uplink transmissions on a second frequency band, at least the second SS comprises a continuous wave (CW) signal, and the method further comprises obtaining the CW signal on at least one of the first frequency band or the second frequency band.

Clause 15: The method of Clause 14, further comprising: measuring signal strengths of a first CW signal on the first frequency band and a second CW signal on the second frequency band; and selecting one of the first CW signal or second CW signal as the second SS based on the measuring.

Clause 16: The method of any one of Clauses 1-15, wherein the second SS comprises at least one of: a first sine wave at a first frequency, or at least a second sine wave at a second frequency.

Clause 17: The method of Clause 16, wherein the frequency synchronization is performed based on a difference between the second frequency and the first frequency.

Clause 18: The method of Clause 16, further comprising outputting, for transmission, a backscattered signal based on a frequency shift relative to at least one of the first frequency or second frequency.

Clause 19: A method of wireless communications at a wireless device, comprising: outputting, for transmission, a first synchronization signal (SS) for timing synchronization; outputting, for transmission, a second SS for frequency synchronization; and communicating in accordance with the first SS and the second SS.

Clause 20: The method of Clause 19, wherein the second SS comprises at least one of a continuous wave (CW) signal or a power-optimized waveform (PoW) signal.

Clause 21: The method of any one of Clauses 19-20, wherein the first SS and second SS are output, for transmission, via separate frequencies.

Clause 22: The method of any one of Clauses 19-21, wherein the first SS and the second SS are output, for transmission, together as a primary SS (PSS) that is repeated with a periodicity.

Clause 23: The method of any one of Clauses 19-22, wherein at least one of the first SS or the second SS is repeated with a configurable periodicity.

Clause 24: The method of any one of Clauses 19-23, wherein the second SS is output, for transmission, in one or more fixed time slots, time slots with a default periodicity, or time slots with a configured periodicity.

Clause 25: The method of Clause 24, further comprising outputting, for transmission, signaling indicating the configured periodicity.

Clause 26: The method of any one of Clauses 19-25, further comprising time division multiplexing the second SS with one or more other types of signals obtained in other time slots.

Clause 27: The method of any one of Clauses 19-26, further comprising obtaining signaling to request transmission of at least one of the first SS or second SS.

Clause 28: The method of any one of Clauses 19-27, wherein the second SS is output, for transmission, in at least one slot configured for wireless energy transfer (WET).

Clause 29: The method of any one of Clauses 19-28, wherein: the communication comprises downlink transmissions on a first frequency band and uplink receptions on a second frequency band, at least the second SS comprises a continuous wave (CW) signal, and the method further comprises outputting, for transmission, the CW signal on at least one of the first frequency band or the second frequency band.

Clause 30: The method of any one of Clauses 19-29, wherein the second SS comprises at least one of: a first sine wave at a first frequency, or at least a second sine wave at a second frequency.

Clause 31: The method of Clause 30, further comprising obtaining a backscattered signal based on a frequency shift relative to at least one of the first frequency or second frequency.

Clause 32: An apparatus, comprising: a memory comprising executable instructions; and a processor configured to execute the executable instructions and cause the apparatus to perform a method in accordance with any one of Clauses 1-31.

Clause 33: An apparatus, comprising means for performing a method in accordance with any one of Clauses 1-31.

Clause 34: A non-transitory computer-readable medium comprising executable instructions that, when executed by a processor of an apparatus, cause the apparatus to perform a method in accordance with any one of Clauses 1-31.

Clause 35: A computer program product embodied on a computer-readable storage medium comprising code for performing a method in accordance with any one of Clauses 1-31.

Clause 36: A user equipment (UE), comprising: at least one transceiver, a memory comprising executable instructions; and a processor configured to execute the executable instructions and cause the UE to perform a method in accordance with any one of Clauses 1-18, wherein the at least one transceiver is configured to communicate with the wireless device.

Clause 37: A network entity, comprising: at least one transceiver, a memory comprising executable instructions; and a processor configured to execute the executable instructions and cause the network entity to perform a method in accordance with any one of Clauses 19-31, wherein the at least one transceiver is configured transmit the first SS and transmit the second SS.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
   at least one transceiver;
   at least one memory comprising executable instructions; and
   one or more processors configured to execute the executable instructions to cause the apparatus to:
      perform timing synchronization based on a first synchronization signal (SS);
      perform frequency synchronization based on a second SS, wherein at least one of the first SS or the second SS is repeated with a configurable periodicity; and
      communicate, via the at least one transceiver, after the performance of the timing synchronization and the performance of the frequency synchronization.

2. The apparatus of claim 1, wherein the second SS comprises at least one of a continuous wave (CW) signal or a power-optimized waveform (PoW) signal.

3. The apparatus of claim 1, wherein, to perform the frequency synchronization, the one or more processors are configured to cause the apparatus to perform the frequency synchronization based on a phase difference between the second SS and a local oscillator frequency.

4. The apparatus of claim 1, wherein the one or more processors are further configured to cause the apparatus to receive, via the at least one transceiver, the first SS and second SS, via separate frequencies.

5. The apparatus of claim 1, wherein the one or more processors are further configured to cause the apparatus to process the first SS and the second SS together as a primary SS (PSS) that is repeated with a periodicity.

6. The apparatus of claim 1, wherein the one or more processors are further configured to cause the apparatus to receive, via the at least one transceiver, the second SS in:
   one or more fixed time slots;
   time slots with a default periodicity; or
   time slots with a configured periodicity.

7. The apparatus of claim 6, wherein the one or more processors are further configured to cause the apparatus to receive, via the at least one transceiver, signaling indicating the configured periodicity.

8. The apparatus of claim 1, wherein:
   the second SS is time division multiplexed with one or more other types of signals obtained in other time slots; and the one or more processors are further configured to cause the apparatus to demultiplex the one or more other types of signals to receive the second SS.

9. The apparatus of claim 1, wherein the one or more processors are further configured to cause the apparatus to transmit, via the at least one transceiver, signaling to request transmission of at least one of the first SS or second SS.

10. The apparatus of claim 1, wherein:
   the one or more processors are further configured to cause the apparatus to receive, via the at least one transceiver, the second SS in at least one slot configured for wireless energy transfer (WET),
   the one or more processors are further configured to cause the apparatus to harvest energy via the WET from the second SS; and
   to communicate, the one or more processors are configured to cause the apparatus to communicate using the harvested energy.

11. The apparatus of claim 1, wherein the one or more processors are further configured to cause the apparatus to:
   measure signal strengths of signals at multiple frequencies; and
   select the second SS for performing the frequency synchronization, based on the measurement.

12. The apparatus of claim 1, wherein:
   the communication comprises downlink receptions on a first frequency band and uplink transmissions on a second frequency band;
   at least the second SS comprises a continuous wave (CW) signal; and
   the one or more processors are further configured to cause the apparatus to:
      receive, via the at least one transceiver, the CW signal on at least one of the first frequency band or the second frequency band;
      measure signal strengths of a first CW signal on the first frequency band and a second CW signal on the second frequency band; and
      select one of the first CW signal or second CW signal as the second SS based on the measuring.

13. The apparatus of claim 1, wherein the second SS comprises at least one of:
   a first sine wave at a first frequency; or
   at least a second sine wave at a second frequency.

14. The apparatus of claim 13, wherein, to perform the frequency synchronization, the one or more processors are configured to cause the apparatus to perform the frequency synchronization based on a difference between the second frequency and the first frequency.

15. The apparatus of claim 13, wherein the one or more processors are further configured to cause the apparatus to transmit, via the at least one transceiver, a backscattered signal based on a frequency shift relative to at least one of the first frequency or second frequency.

16. The apparatus of claim 1,
   wherein the apparatus is configured to operate as a user equipment (UE).

17. An apparatus for wireless communications, comprising:
   at least one transceiver;
   at least one memory comprising executable instructions; and
   one or more processors configured to execute the executable instructions to cause the apparatus to:
      transmit, via the at least one transceiver, a first synchronization signal (SS) for timing synchronization;

transmit, via the at least one transceiver, a second SS for frequency synchronization, wherein at least one of the first SS or the second SS is repeated with a configurable periodicity; and communicate, via the at least one transceiver, in accordance with the first SS and the second SS.

18. The apparatus of claim 17, wherein the second SS comprises at least one of a continuous wave (CW) signal or a power-optimized waveform (PoW) signal.

19. The apparatus of claim 17, wherein, to transmit the first SS and second SS, the one or more processors are configured to cause the apparatus to transmit the first SS and the second SS via separate frequencies.

20. The apparatus of claim 17, wherein, to transmit the first SS and the second SS, the one or more processors are configured to cause the apparatus to transmit the first SS and the second SS together as a primary SS (PSS) that is repeated with a periodicity.

21. The apparatus of claim 17, wherein, to transmit the second SS, the one or more processors are configured to cause the apparatus to transmit the second SS in:

one or more fixed time slots;

time slots with a default periodicity; or time slots with a configured periodicity.

22. The apparatus of claim 21, wherein the one or more processors are further configured to cause the apparatus to transmit, via the at least one transceiver, signaling indicating the configured periodicity.

23. The apparatus of claim 17, wherein the one or more processors are further configured to cause the apparatus to at least one of:

time division multiplex the second SS with one or more other types of signals received in other time slots; or transmit, via the at least one transceiver, in at least one slot configured for wireless energy transfer (WET).

24. The apparatus of claim 17, wherein the one or more processors are further configured to cause the apparatus to receive, via the at least one transceiver, signaling to request transmission of at least one of the first SS or second SS.

25. The apparatus of claim 17, wherein:

the communication comprises downlink transmissions on a first frequency band and uplink receptions on a second frequency band;

at least the second SS comprises a continuous wave (CW) signal; and to transmit the second SS, the one or more processors are configured to cause the apparatus to transmit the CW signal on at least one of the first frequency band or the second frequency band.

26. The apparatus of claim 17, wherein:

the second SS comprises at least one of:

a first sine wave at a first frequency; or at least a second sine wave at a second frequency; and the one or more processors are further configured to cause the apparatus to receive, via the at least one transceiver, a backscattered signal based on a frequency shift relative to at least one of the first frequency or second frequency.

27. The apparatus of claim 17, wherein the apparatus is configured to operate as a network entity.

28. A method of wireless communications by a wireless node, comprising:

performing timing synchronization based on a first synchronization signal (SS);

performing frequency synchronization based on a second SS, wherein at least one of the first SS or the second SS is repeated with a configurable periodicity; and communicating after performing the timing synchronization and performing the frequency synchronization.

* * * * *